United States Patent [19]

Aikens

[11] Patent Number: 5,016,143
[45] Date of Patent: * May 14, 1991

[54] ILLUMINATING SYSTEM

[75] Inventor: Wallace R. Aikens, Plano, Tex.

[73] Assignee: Gulton Industries, Inc., Plano, Tex.

[*] Notice: The portion of the term of this patent subsequent to Feb. 26, 2008 has been disclaimed.

[21] Appl. No.: 395,889

[22] Filed: Aug. 18, 1989

Related U.S. Application Data

[63] Continuation-in-part of Ser. No. 255,062, Oct. 7, 1988.

[51] Int. Cl.$^5$ .............................................. F21V 5/00
[52] U.S. Cl. ..................... 362/32; 362/293; 362/812; 362/287; 362/427; 40/546
[58] Field of Search .................. 362/31, 32, 293, 247, 362/23, 26, 27, 30, 235, 242, 243, 319, 322, 324, 340, 806, 812, 427, 296, 307; 40/546, 547, 431; 350/167, 286, 96.10

[56] References Cited

U.S. PATENT DOCUMENTS

| | | |
|---|---|---|
| 569,764 | 10/1896 | Nason . |
| 1,615,449 | 3/1925 | Fullerton . |
| 1,741,748 | 12/1929 | White ..................... 40/546 |
| 1,837,091 | 12/1931 | Adams . |
| 2,018,732 | 10/1935 | May . |
| 2,041,909 | 5/1936 | Emmert et al. . |
| 2,374,640 | 4/1945 | Paul . |
| 2,493,829 | 1/1950 | Paul . |
| 2,520,028 | 6/1950 | Biskard ................. 362/23 |
| 2,567,403 | 9/1951 | Rockola . |
| 2,795,069 | 6/1957 | Hardesty . |
| 2,831,283 | 4/1958 | Bone . |
| 3,302,012 | 1/1967 | Reppisch ............... 362/32 |
| 3,399,476 | 9/1968 | David ..................... 40/431 |
| 3,486,261 | 12/1969 | Hardesty ............... 40/546 |
| 4,525,772 | 6/1985 | Peck ..................... 362/293 |
| 4,558,401 | 12/1985 | Tysoe ..................... 362/293 |
| 4,561,013 | 12/1985 | Thompson ............. 362/32 |
| 4,750,798 | 6/1988 | Whitehead . |
| 4,805,984 | 2/1989 | Cobb, Jr. ............... 350/96.28 |

FOREIGN PATENT DOCUMENTS 688289 1/1930 France .

Primary Examiner—Stephen F. Husar
Assistant Examiner—D. M. Cox
Attorney, Agent, or Firm—Darby & Darby

[57] ABSTRACT

An arrangement and method for providing an elongated light source, such as for illuminating a sign or the like or, for other display, which includes emitting light from an exterior light source into an inner tube having a portion lined with a high reflectance film of prismatic lenses, the tube having a light-transition opening along its length, with a diffusing medium substantially diametrically opposite such opening, and optionally a reflector at one end of the inner tube. The inner tube is concentrically surrounded by an outer tube having light-transmissive portions of different colors. The outer tube is rotatable relative to the inner tube. The emitted light propagates in the inner tube by reflecting from the high reflectance lining and the reflector to impinge on the diffusing medium and thereby transmit light outwardly through the light-transmissive opening and thereafter through a selected one of the colored portions so as to project colored light against a sign or like object. The arrangement and method may be used as a color display, for both ambient-light and internal illumination, by interspersing the light-transmissive portions with opaque portions of substantially the same color. Several units may be placed end to end to provide a color-code display.

29 Claims, 4 Drawing Sheets

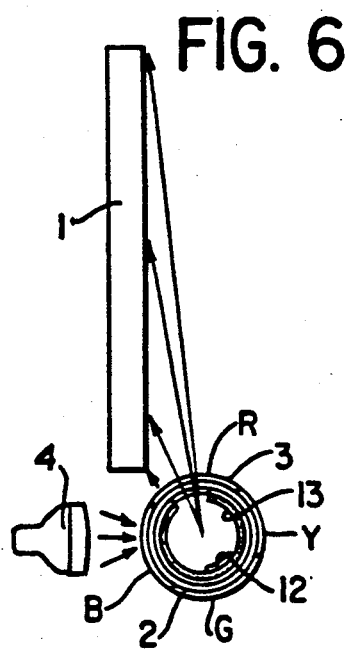
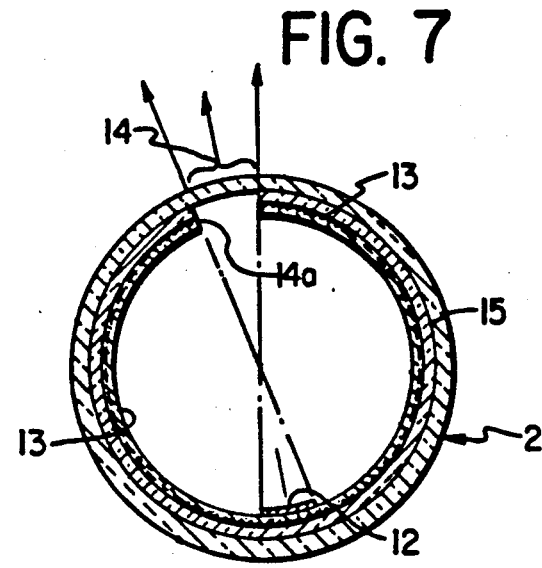
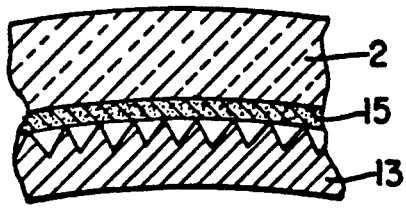
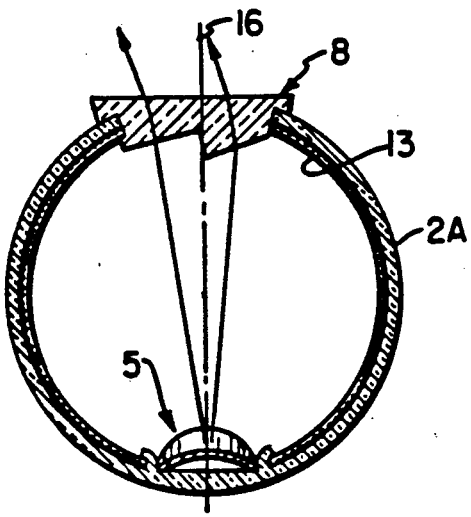
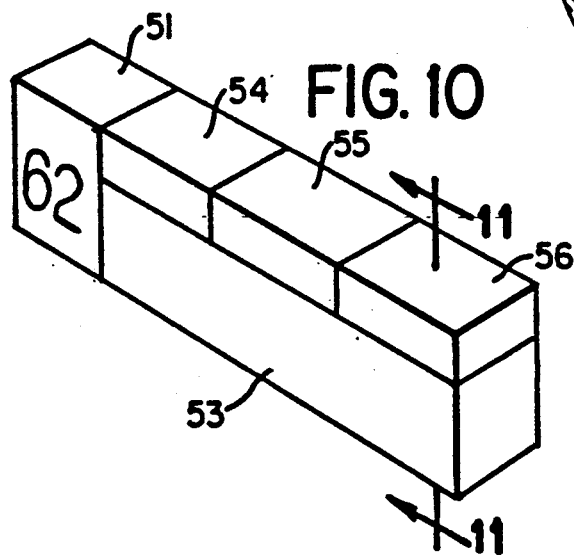
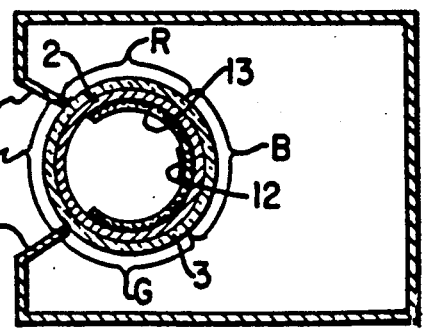

ILLUMINATING SYSTEM

The present application is a continuation-in-part of prior application Ser. No. 255,062 for Multi-Color Illuminating System, filed Oct. 7, 1988.

BACKGROUND OF THE INVENTION

The present invention relates to an illuminating system, particularly useful for route and destination signs and for illuminating displays, such as for aircraft, buses or other vehicles.

Readability of signs or displays, such as those for route and destination indication on public motor vehicles, buses and trains, or instrument panels for aircraft, is affected by day and night conditions, such as glare and external light. Readability can be improved by increasing contrast, since the greater the contrast, the greater will be legibility. While illumination systems have been employed to improve readability, existing illumination systems do not provide a uniform or even distribution of light. Bright spots, darkened areas at the end of the sign or display, and a halo of light along the bottom of the display or sign may appear, depending upon the arrangement of the light source utilized for illumination.

An optical film designed to convert point sources of light into an evenly dispersed area of light has been developed under the trade name 3M Brand Scotchlamp Film, and is shown in U.S. Pat. No. 4,260,220. The film is made of transparent plastic in sheet form, which is smooth on one side and grooved on the other. Its thickness is about 20 mils (0.02 inch). The grooves are actually tiny optical prisms with fragile corners and delicate faces. The film is flexible, and may be readily rolled or bent. It may be called a transreflective material.

This film is used as a part of prism light guides which distribute sunlight received from a solar light tracking system to illuminate indoor office space evenly. In the February 1987 issue of the trade magazine Architectural Lighting, there was an article about this application which suggests illuminating decorative, attention-getting displays with such prism light guides. This article suggests that colored light could be provided by fitting a luminaire with colored PAR lamps. The light could be controlled in three ways: electronic dimmers and a small microprocessor; rotating filter wheels with different colored gels; or solenoid-operated dichroic filters in front of white light sources.

Further, the use of rotatable translucent multi-color tubes is known in which a light source is arranged directly inside the tube itself and portions of the color tube are shielded so that only a desired colored segment of the color tube is illuminated by the light source. An example of such a tube is disclosed in U.S. Pat. No. 2,374,640.

SUMMARY OF THE PRESENT INVENTION

It is an object of the present invention to improve the readability of signs and panels by illuminating them with evenly distributed light which may be selectively colored.

It is also an object to provide an improved elongated light source, which may be selectively colored.

In keeping with this object, and others which will become apparent below, one aspect of the present invention resides in an arrangement for illuminating, comprising a source emitting light into a tube with a transparent portion. The light source may be arranged outside of the tube so as to emit light into the tube through an open end. A high reflectance or transreflective film covers a portion of the inner surface of the inner tube and distributes light along the length of the tube, which has a longitudinal area through which light is transmissible. The film is preferably formed with optical prisms for multiply reflecting the light inside the tube.

A diffusing medium is arranged in the tube diametrically opposite the light-transmissive longitudinal area so that, after the light strikes the diffusing medium, the light is scattered or diffused outwardly through the longitudinal area. A reflector may be placed at the opposite end of the inner tube from the light source to reflect light back into the tube.

It is an additional object to provide selective colored illumination, as by providing an outer tube having a plurality of transparent or translucent colored portions each of a different color and concentrically surrounding such a tube. The outer tube is rotatable into a predetermined position by a motor drive to select a desired color for illumination. The outer tube is formed so that when in a predetermined position only one of its color portions is exposed to the light transmitted through the inner tube's light-transmissive longitudinal area.

It is a further object to provide an improved illumination, as by use of a lens in the light-transmissive longitudinal area.

It is another object to provide improved color illumination, as by use of one or more extensions on the outer tube adapted to receive color inserts or by use of color silkscreened on the outer tube.

It is still another object to provide an improved elongated light source having substantially uniform illumination along its length.

For a better understanding of the present invention, reference is made to the following description and accompanying drawings while the scope of the invention will be pointed out in the appended claims.

BRIEF DESCRIPTION OF THE DRAWINGS

FIG. 6 is a schematic end elevation view of the arrangement of FIG. 4, in which light rays are represented by arrows.

FIG. 7 is a transverse sectional view of the light guide tube of FIG. 6 by itself.

FIG. 8 is an enlarged fragmentary view of a portion of the tube of FIG. 7.

FIG. 9 is a transverse sectional view of a light guide tube in accordance with a second embodiment of the invention.

FIG. 10 is a perspective view of a destination sign, for buses or the like, utilizing three selectable-color light tubes similar to those of FIGS. 1-8 and 9.

FIG. 11 is a transverse sectional view of one of the light guide tubes of FIG. 10.

DETAILED DESCRIPTION OF THE PREFERRED EMBODIMENT

Figure 4:
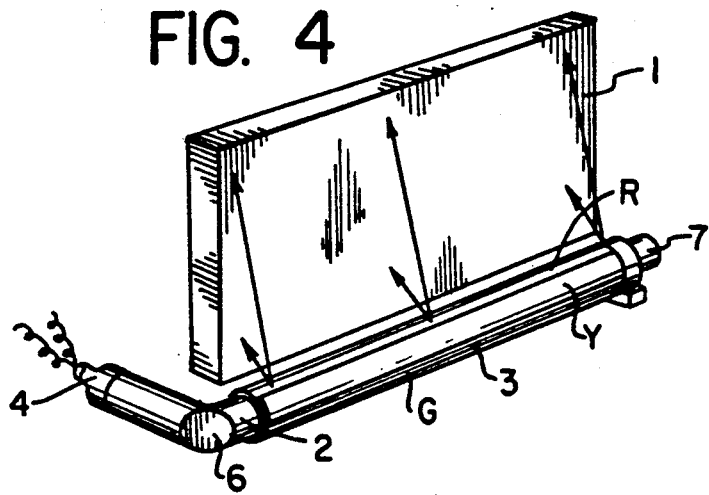
FIG. 4 is a schematic perspective view of a multi-color illumination arrangement in accordance with the present invention, in place for illuminating a sign.
Figure 5:
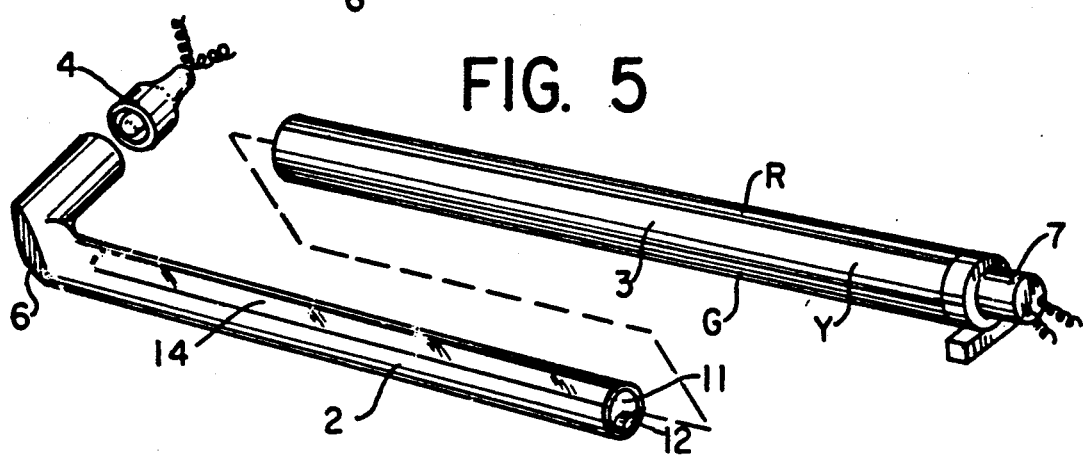
FIG. 5 is a schematic exploded perspective view of the arrangement of FIG. 4.

Referring now to FIGS. 4 to 6 of the drawings, a sign 1 is illuminated by evenly distributed colored light from a multi-colored illumination arrangement. This arrangement includes a light source 4 with reflector, an inner tube 2, an outer tube 3, reflectors 6, 11, a diffusing medium 12, a high reflectance light-distribution film 13, and a motor assembly 7.

The reflector 6 is angled to reflect light emanating from the light source 4 into the inner tube 2. The reflector 6 is preferably made of 3M SILVERLUX material. The light then propagates inside the inner tube by reflecting off the high reflectance film or sheet 13, which is preferably 3M Scotchlamp film, whose properties are described below. Reflector 11 is arranged at the end of the inner tube 2 furthest from the light source 4 so as to reflect propagated light back into the inner tube 2.

Figure 3:
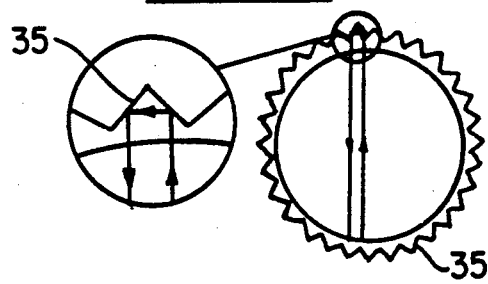
FIG. 3 is a schematic transverse view of FIG. 2, in which light rays are shown, to illustrate total internal reflection off prism faces, with the encircled portion shown also enlarged.

The diffusing medium 12, which may be a dull white colored strip or coating to cause diffusion or scattering of the light impinging thereon, extends along the length of the inner tube 2 near the bottom, as seen in FIG. 3. The diffusing medium 12 is substantially diametrically opposite a longitudinally extending light-transmissive portion or opening 14 in the wall of the inner tube 2, which registers with a gap 14A in the film 13. When the light strikes the diffusing medium 12, the light diffuses or scatters, with some passing through the light-transmissive portion 14. The rest is multiply reflected by film 13, ultimately striking diffusing medium 12 to pass through light-transmissive portion 14. The diffusing medium may be a dull white strip laid or coated on the inner surface of the film 13. Alternately, the film 13 may have a longitudinal slot into which the diffusing medium is placed.

Figure 1:
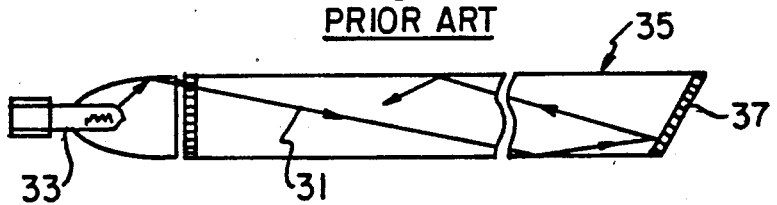
FIG. 1 is a schematic side longitudinal view of a light guide tube with light propagating through the tube from a light source, in accordance with the prior art.
Figure 2:
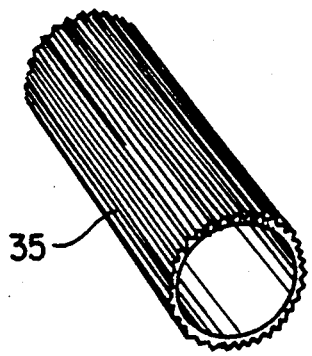
FIG. 2 is a schematic perspective view of the light guide tube of FIG. 1.

The high reflectance film 13 is a thin, flexible, clear transparent material, such as acrylic or polycarbonate polymer, with a smooth surface on one side and prismatic grooves on the other side, which form on the inner surface of inner tube 2 tiny optical prisms that extend longitudinally along tube 2. The properties of such a film are illustrated in FIG. 1, which schematically shows a light guide tube 35 and an external light source 33 with reflector. The light guide tube 35 is formed of Scotchlamp material, having a transparent wall with a grooved outer surface forming prismatic facets, which are efficient total internal reflection surfaces and prevent light which is travelling down the guide tube from escaping through the film 13. Each prismatic facet has two prism faces inclining outward towards each other and into contact with each other so as to have a V-like shape. These are more clearly shown in FIGS. 2 and 3.

Referring again to FIG. 1, it can be seen that a light ray 31, emitted from the external light source 33, strikes the interior of the transparent wall of a guide tube 35, through which the light refracts in accordance with Snell's law to pass through the body of the transparent wall.

If the ray strikes one prism face at any angle less than the critical angle for total internal reflection, it reflects by total internal reflection and heads for the other prism face of the same prismatic facet. If reflected by total internal reflection again, it returns to the interior of the tube for further propagation. A ray will be reflected if the angle it makes with the tube axis is less than about 27 degrees. The exact angular value is dependent upon the refractive index of the transparent material.

The film 13 is formed to reflect the light and to minimize absorption and transmission. Absorption per bounce for a typical ray has been found to be as low as a 0.12% and residual transmission losses maybe about 1.2% for typical angles of incidence. Reflectance is thus about 98.7%.

Upon reaching the end of the tube 35 which is furthest from the light source 33, the light ray is reflected by a reflector 37 back into the guide tube.

In order to avoid even residual transmission losses, a white surface 15 may be added between the inner tube 2 and the high reflectance film 13 as shown in FIG. 7. Thus, light which may be transmitted through the film 13, which would otherwise be a residual transmission loss, is diffused or reflected back into the inner tube from the white surface 15 and is thereby retained to enhance efficiency.

Referring again to FIGS. 4 to 7, the outer tube 3 concentrically surrounds the inner tube 2. A motor assembly 7 is used to rotatably position the outer tube 3 relative to the inner tube 2 in any conventional manner. The outer tube 3 is formed of a number of longitudinal light-transmissive (transparent or translucent) colored filter sections (as seen in FIG. 6), any one section being positionable to be opposite the light-transmissive portion 14. The color filter segments of the outer tube 3 may be in the form of either transparent color inserts suitably held to the outer tube, as by projecting lips, or transparent color silk-screened onto the segments of the tube 3. Preferably, the outer tube 3 is divided into color quadrants, each quadrant having a different color such as green G, red R, yellow Y, and blue or black B, each of which extends along substantially the full length of the outer tube 3. In this way the light then projects outwardly from the entire length of the sign 1 to effect illumination of the sign 1 with a single colored light.

Figure 12:
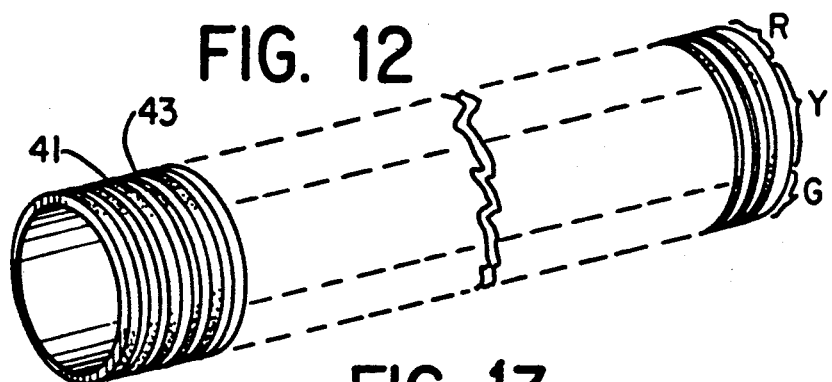
FIG. 12 is a perspective view of a multiple-color outer tube useful in the preceding embodiments.
Figure 13:
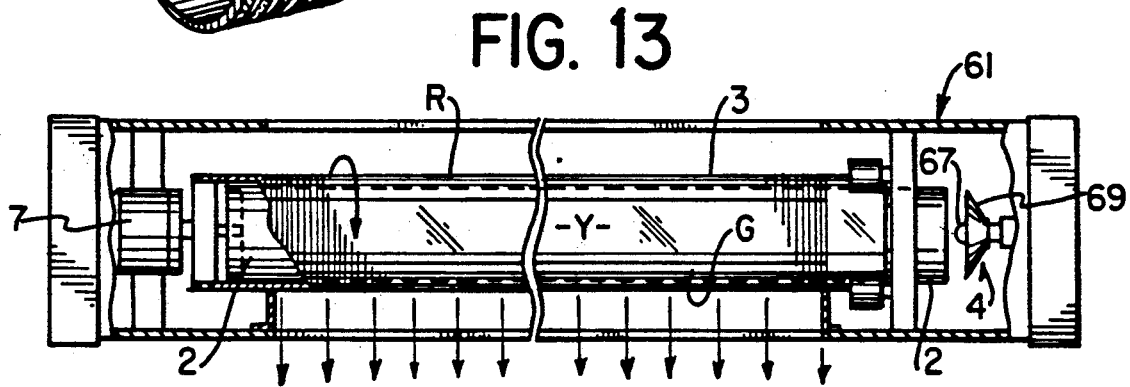
FIG. 13 is a longitudinal view partly in section of a multi-color extended light source useful in preceding embodiments.

When used in a bus sign, for example, the colored light transmitted by the colored filter sections R, Y, G, B may not be highly visible in daylight, and such colored light-transmitting filter sections are usually poor light reflectors, leading to poor daylight visibility. This may be overcome by making each color-transmitting section partially efficiently light-transmissive and partially efficiently light-reflective. For example, as shown in FIG. 12, each section R, Y, G or B may be formed of alternate stripes 41 of color-filter material (shown stippled) and intervening stripes 43 of color-reflecting material. In each quadrant, the color-filtering and color-reflecting materials are preferably chosen to have closely similar color as perceived either in daylight or night-time.

If desired, a controller or a computer may be used to control the positioning of the outer tube 3 so that a desired color segment R, Y, G, or B will be exposed to filter the light passing through the light-transmissive portion of the inner tube 2 or to be reflected by ambient light.

The light source 4 does not necessarily have to be arranged perpendicular to the axis of the inner tube 2. Any angular orientation can be used if accompanied by an appropriate position of the reflector 6 to reflect the light nearly axially into the inner tube 2. If the light source 4 and the inner tube 2 are substantially co-linearly arranged, no reflector 6 is needed. A reflector may be used surrounding the light source or bulb, to focus the light rays to be substantially axial of or slightly converging along the tube, as indicated schematically in FIG. 6. However, a perpendicular orientation for the light source axis is preferred to obtain better accessibility to the light source bulb for replacement purposes, and to reduce the axial dimensions of the system. This is advantageous when the sign to be illuminated is on a bus, since there may be insufficient space available at the side of the sign for gaining access to the bulb and effecting removal and replacement when needed.

FIG. 7 shows a schematic sectional view of the inner tube alone, depicting the path of certain light rays. The only light emitted to the exterior is through the light-transmissive portion 14, derived from the diffusing medium 12. The film 13 on the inner surface of tube 2 between diffusing medium 12 and the light-transmissive portion 14 serves primarily to distribute the light uniformly along the length of the tube 2, without directly passing through the light-transmissive portion 14. After multiple reflections, the light ultimately hits the diffusing medium 12. Those rays from diffusing medium 12 which do not exit from the light-transmissive portion 14 are internally reflected and multiply, with little loss, to impinge again on diffusing medium 12. Thus, ultimately nearly all the light energy is emitted through the light-transmissive portion 14, with very little loss.

FIG. 9 shows a view similar to FIG. 7 for a second embodiment. In FIG. 9, an opaque tube 2A, which may be an aluminum extrusion, is used in the same way as inner tube 2. The opaque inner tube 2A also has a portion lined with the high reflectance film 13 except for an unlined portion or gap in the form of a longitudinal slit in which is placed a lens 8 which longitudinally extends along a length of the tube 2A. In order to avoid residual transmissive losses through the film 13, the inner surface of the tube 2A is made white or reflective so that light transmitting through the film diffuses or reflects back into the tube 2A and is thereby retained.

The lens 8 may be designed in known manner to provide a more uniform illumination from the bottom to the top of a sign 1 (see FIG. 6) and to adjust for the shorter path length for light rays impinging on the lower portion of the sign 1. The lens 8 may be linear, prismatic, clear and illustratively is composed of polycarbonate material.

A diffusing medium 5 is also arranged diametrically opposite the lens 8 and, for improved uniformity of light distribution along the tube length, may be of a varying width. The diffusing medium 5 widens as it extends longitudinally away from the light source 4 in the embodiment of FIG. 5. As one example, the diffusing medium may have a width 5A of 0.43 inches nearest the light source, a width 5B of 0.58 inches about midway along the length of the inner tube 2, and a width 5C of 0.88 inches furthest from the light source 4 or nearest the end reflector 6. This varying width may be provided by bulging the diffusing material to provide a varying curved-surface width along the length of tube 2A. This may be provided, for example, by forming a uniform width groove or slot in the tube 2A, with edges to retain a strip of diffusing material of gradually varying width, providing gradually varying bulging of the strip along its length. This varying width aids in providing uniformity of illumination along the length of the light tube 2 by compensating for a tendency for a greater amount of light to pass through the light-transmissive portion 14 nearer the source than at the remote end of tube 2A.

Also, the lens 8, which is preferable of a unitary piece construction, may have two or more transverse sections 8A and 8B. Such sections are useful to project the diffused light rays on either side of the centerline 16 of FIG. 9 to effect more uniform illumination over a sign such as sign 1. Each lens section 8A, 8B has a sloping surface relative to the centerline 16 so as to refract the light which is emitted from the curved surface of the diffusing medium 5, to distribute the light more uniformly over sign 1.

Further, since the light has further to travel to reach the top of an object or sign to be illuminated than to the bottom, the angle of refraction of the light leaving the various lens sections may be different. One way to achieve a different angle of refraction with the same lens material is by having one section formed thicker than the other as shown in FIG. 9. Another way would be to obtain a different angle of refraction by using lens sections of different material. Thus, each lens section may actually be a separate lens with its own refractive index different from that of the other.

The light source 4 is preferably an incandescent halogen lamp which has advantages over a fluorescent lamp. For example where lower wattage is desired, one 20 watt incandescent halogen lamp can replace two 20 watt fluorescent lamps while providing an improved lighting effect. Such halogen lamps provide higher intensities, with a narrower beam, more uniform brightness (top to bottom of sign), easy relamping through the back without opening the back cover, lower cost and fewer components (socket and lamp versus two lamps, two sockets, a ballast and wiring channel), and require less input power (e.g. 20 watts versus 43 watts). In addition, such lamps produce ultra-violet light which can be made to interact with fluorescent material on the illuminated surface to give enhanced brightness or special effects.

Further, the showing of darkened letters at each end of the sign or of a halo of light along tee bottom of the sign is inhibited by the use of the present invention with halogen lamps. Where the electronic sign employs yellow dots or disks for the lettering, these dots or disks remain yellow in appearance in light from the halogen lamp rather than appearing yellow-green as would be common with light from fluorescent lamps. These advantages override a disadvantage of the halogen lamp, namely, that the halogen lamp has a life which is less than that of fluorescent lamps.

In order to facilitate accessability, tube 2 or 2A may be split longitudinally and at the diffusing medium 5, and thus formed in two nearly half-cylinder sections. The two halves may be joined, together with the lens 8 and diffusing medium 5, by an end ring or cylinder, which for example may carry a gear to be driven by the motor drive assembly.

Instead of illuminating an essentially vertical surface, as shown in FIG. 4, the illumination arrangement of the present invention may be used to provide forward-facing selectable-color light bars. Multiple multi-color illumination arrangements of the invention may also be arranged end to end, as seen in FIG. 10. That figure illustrates use of the present invention in a bus destination sign display, having a section 51 displaying a bus route number, a section 53 displaying a bus destination, and three sections 54, 55, 56, each of which is a structure as described above which displays an elongated bar of a selectable color R, Y, G, B. Thus 3-color codes, up to 64 in number, may be displayed, which would be intelligible at a greater distance than letters or numbers may be legible. Obviously as many sections like 54, 55, 56 may be used as desired, to afford a greater variety of codes. In this arrangement it may be desirable to have the inner tubes communicate with each other at their adjacent ends, which are then left open, with a single light source at one end or a light source at each end. The motor drive assemblies for such arrangements are then arranged to act on the respective outer tubes but not to interfere with light communication between the inner tubes. Alternatively, each segment may be an independent unit, with its own light source and motor drive.

As shown in this figure, the light emitted from the light guide may be enhanced and its distribution improved by use of image enhancer plates which of course may be used with any of the forms of light guide of the present invention. In FIG. 11, image enhancer plates 9 are shown on either side of the gap 14A, inclining inward from a housing assembly 10 towards the outer tube 3. These plates 9 are light-reflective and increase the apparent size of a colored segment of the color tube 3. These image enhancer plates 9 ideally extend longitudinally along the entire length of the outer tube 3 and may further extend transversely at the ends of the outer tube so as to incline outward along the entire periphery of the outer tube's color segment which is exposed to light from the inner tube 2 or 2A.

In an alternate embodiment, the image enhancer plates 9 may incline outward from adjacent the periphery of the light-transmissive portion of the inner tube 2 or 2A. Such arrangements may also be used to enhance the light passing through the light-transmissible portion when no color-creating outer tube 3 is employed.

The image enhancer plates 9 help to uniformly distribute and enhance the illuminating effect of the light transmitting through the light-transmissible portion by reflecting light which would not have been directed at the object or sign to be illuminated and thus would have been lost. The enhancer plates thereby capture this otherwise lost light.

An observer looking head-on at the colored segment of the outer tube and the enhancer plates 9 (from the left in FIG. 6) will get an impression of a full rectangle of color, the size of the outer periphery of the plates. This impression is most pronounced when the image enhancer plates have a substantially parabolic curvature, although flat plates are a decided advantage. It can be readily understood that the surfaces of such enhancer plates may be formed curved, as desired, to illuminate the sign or object uniformly throughout. Thus, in the usage of FIG. 4 or 6, their surfaces may be formed to reflect more light on the area of the sign 1 furthest away from the tubes 2,3 so that the entire sign would appear to be illuminated by the same intensity of light.

Figure 14:
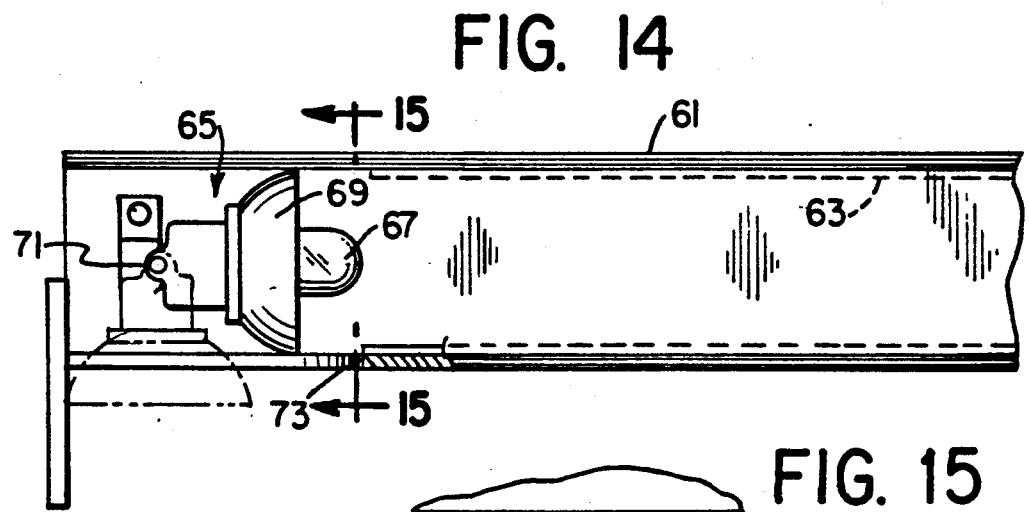
FIG. 14 is a fragmentary longitudinal section of an extended light source utilizing the principles of the invention.
Figure 15:
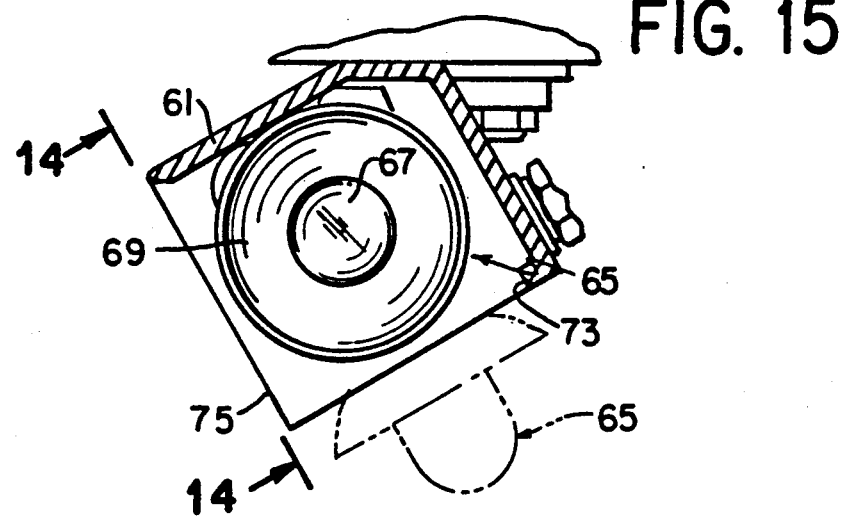
FIG. 15 is a cross-sectional view of FIG. 14 viewed along line 14—14 thereof.

FIGS. 14–15 show an improved arrangement where color 15 change is not needed. Here the housing 61 contains a stationary light guide arrangement 63 whose construction may be that of FIG. 7 or FIG. 9 without the outer tube or its drive. A light source assembly 65 is located at each end, comprising a light bulb 67 and reflector 69 for directing light along light guide 63. The assembly 65 is pivoted at 71 so that it may be extended beyond housing 61 though an opening 73, as seen in dashed line in FIG. 15, to permit easy replacement of bulb 67 when needed. Conventional latching means (not shown) usually retain each source 65 in operative position as shown in FIG. 14. Housing 61 is open along one side 75. Thus, an extended generally uniform illumination is provided, of any desired length, determined by the length of light guide arrangement 63.

Figure 16:
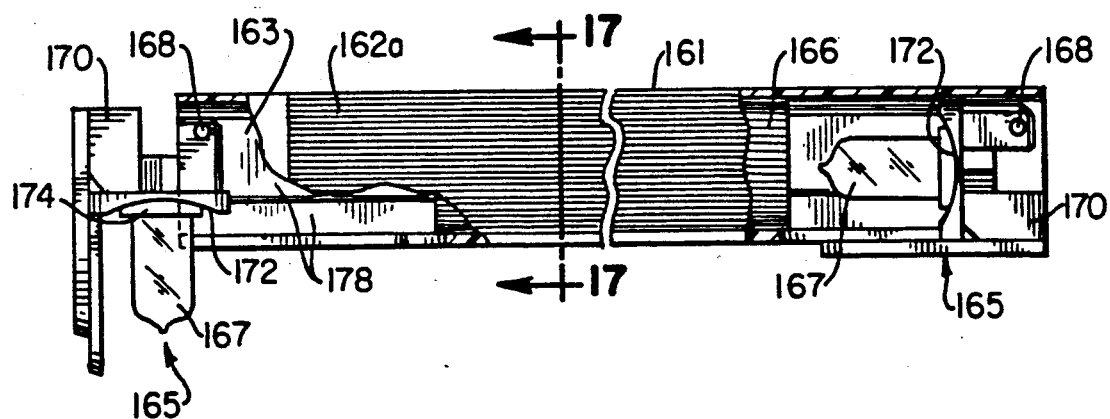
FIG. 16 is a longitudinal view, partly broken away, of a modification of the device of FIG. 14.
Figure 17:
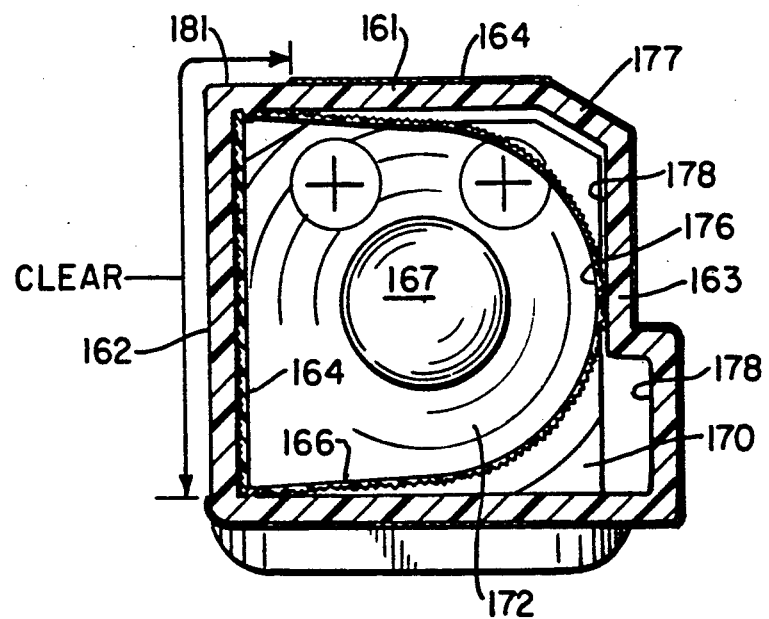
FIG. 17 is a cross-sectional view of the device of FIG. 16, viewed along line 17—17 thereof.

FIGS. 16 and 17 show a modified arrangement of the arrangement of FIGS. 14 and 15. The housing 161 is formed of a clear transparent plastic having a light-transmitting face 162 and a back portion 163 where the clear transparent plastic is covered by an opaque coating, such as of black lacquer 164. Juxtaposed on the inner side of the clear housing face 162 is a flat plate or sheet 164 formed of the same transreflective material as the light guide arrangement described above with respect to FIG. 3. Also substantially lining the inner side of the opaque portion 163 of housing 163 is a curved sheet 166 of the same transreflective light guide material. Flat sheet 164 and curved sheet 166 together, formed cylindrical light guide arrangement as above, but of non-circular cross section.

At each end of the housing 163 is a light assembly 165. Each light assembly 165 is pivoted at 168 to the housing 163 so that, as shown in the left portion of FIG. 16, the light assembly 165 may be pivoted by 90° to make the light bulb 167 accessible for replacement purposes. The light assembly 165 is formed of a support 170 carrying a curved reflector 172 which may be of parabolic shape. At the center of reflector 172 is a lamp socket (indicated generally at 174) into which a light bulb 167 may be plugged. The light bulb socket 174 has contacts (not shown) which engage the terminals of the light bulb 166 and are connected to terminals 165 for electrical connection to a suitable source of electrical power. By this arrangement the light bulb 167 extends generally axially of the housing 163 with its reflector 172 behind it, when the assembly is in the operative position shown at the right side of FIG. 16. The light bulb 167 therefore projects its light along the interior of the housing longitudinally of the cylindrical light guide formed by 164,166.

The properties of the light guide are as described above, so that light rays impinging at a shallow angle on the interior of the light guide are reflected inwardly. Those rays that travel the length of the housing 163 will then be reflected by the reflector 172 at the opposite end. Accordingly, the light rays travel back and forth within the light guide. Certain of the rays impinging on the sheets 164, 166 may be refracted by the material of the light guide and exit from the light guide. To preserve efficiency, the interior of the housing 163 which surrounds the curved light guide sheet 166 is coated or painted white, so that any light which may exit from the light guide is in turn reflected or diffracted back into the light guide. Alternatively, the transparent housing may be coated white on its exterior, beneath any black or opaque outer coating.

As in the case of preceding figures, a central portion of the curved light guide sheet 166 may (but need not) have a diffusing strip 176 extending along its length diametrically opposite from the clear face 162 of the housing 161.

Also, as shown in FIG. 16, the flat sheet 164 preferably has a length greater than that of the curved sheet 166 so that the curved light guide sheet 166 covers only the central part of the length of the housing 161. Thus the curved sheet 166 backs up only a portion of the flat sheet 164, leaving end portions 162A of the flat sheet 162 unbacked by the curved sheet 166, but backed by the white surface 178 of the interior of the housing 161. As a result, the white sections 178 at each end of the housing serve as diffusing areas from which light rays are directed nearly perpendicularly or at other angles to sheet 164. These light rays may pass through sheet 164 and provide illumination.

In addition, as seen in FIG. 16, the flat or front face of the housing may extend to a region 181 at the top edge of the housing 163 at an angle to the front face. Therefore, particularly in the regions to which the curved light guide sheet 166 does not extend, light rays may exit directly through the clear area 181 of the housing 161 for further regulation of the distribution of the light emitted from this arrangement.

The housing 161 may have a flattened corner shown at 177, which forms a surface for mounting the housing under a shelf or light shield. The clear region 181 thus illuminate generally forwardly while the front face 162 would illuminate generally at a downward angle, and provides a diffused light source essentially without glare. This is particularly useful for illuminating instrument panels of an aircraft, beneath a glare shield under which the arrangement may be mounted. It will be understood that sheet 164 and areas 178 may be suitably colored if desired.

It will be understood that, where color change is not needed in any of the foregoing forms of the invention, a stationary single-color outer tube may be used in place of the rotatable outer tube, or the outer tube may be dispensed with entirely. In the latter case, the diffusing strip 12 may be appropriately colored, when desired to provide a non-white illumination, such as for photographic dark rooms or night illumination of instrument panels.

Where desired, an extended-length source of infrared or ultra-violet light may be provided by the present arrangement by placing an appropriate infra-red or ultra-violet filter between light source 4 or 65 and the light guide, or otherwise inputting only infra-red or ultra-violet light to the light guide.

While the foregoing description and drawings represent the preferred embodiments of the present invention, it will be understood that various changes and modifications may be made without departing from the spirit and scope of the present invention.

I claim:

1. An elongated lighting arrangement comprising:
    an elongated tube having an interior and having the property of propagating light axially therewithin,
    said tube having a light-transmissible wall portion extending along the length of the tube and extending only partially around the circumference of said tube,
    said tube also having an internally reflective surface for propagating light within and along the axis of the tube by reflection by said surface when light is supplied to said interior,
    a longitudinally extending diffusing medium arranged in said tube interior and only partially around the inner periphery of said tube and substantially diametrically opposite said light-transmissible wall portion to diffuse light striking said diffusing medium both directly and by reflection from said reflective wall surface,
    said light-transmissible wall portion, said diffusing medium and said reflective surface extending longitudinally of said tube and in the aggregate over substantially the entire inner periphery of the cross-section of said tube,
    whereby light supplied to said tube is propagated along said tube and light in said tube impinging on said diffusing medium causes light from the diffusing medium to pass outwardly through said light-transmissible portion.

2. An arrangement as in claim 1 further comprising a reflector at an end of said tube for reflecting light striking said reflector back into the interior of said tube, whereby the light exiting said light-transmissible portion is distributed over the length of said tube.

3. An arrangement according to claim 1, further comprising:
    a light source for emitting light into said tube at one end thereof.

4. An arrangement according to claim 3, wherein said diffusing medium has a varying width, which width increases outward away from said light source so as to assist in uniformly illuminating along the length of said elongated tube.

5. An arrangement according to claim 1, further comprising:
    a light reflector extending outwardly from each longitudinal edge of said light-transmissible tube portion, said light reflectors also extending longitudinally along said tube, whereby the apparent transverse width of said lighting arrangement is increased.

6. The arrangement as defined in claim 1, wherein said diffusing medium is formed to scatter the light through the light-transmissible portion with substantially uniform intensity along said elongated tube.

7. An arrangement according to claim 1, wherein said diffusing medium has a curved surface projecting inwardly of said tube, said curved surface having varying arcuate width along the length of said diffusing medium.

8. An arrangement as in 3 further including a second light source arranged to emit light into said elongated tube at the end thereof opposite said first light source.

9. An elongated lighting arrangement comprising
    an elongated tube having an interior,
    said tube having a light-transmissible wall portion extending along the length of said tube,
    said tube also having an internally reflective surface for propagating light within and along the axis of the tube;
    a longitudinally extending diffusing medium arranged in said tube interior substantially diametrically opposite said light-transmissible wall portion to diffuse light striking said diffusing medium both directly and by reflection from said reflective wall surface, said surface being formed of a transparent sheet having longitudinally extending prisms formed therein, whereby light supplied to said tube is propagated along said tube and light in said tube impinging on said diffusing medium causes light from the diffusing medium to pass outwardly through said light-transmissible portion.

10. The arrangement as defined in claim 9, wherein said tube has a surface facing said transparent sheet which is formed to return light transmitted through said sheet back into said interior of said tube.

11. An elongated lighting arrangement comprising
an elongated tube having an interior,
a light source for emitting light into said tube at one end thereof,
said light source being adapted to project light at an angle to said tube,
a reflector arranged between said light source and said elongated tube, said reflector being arranged to reflect the light from said light source into said tube,
said tube also having an internally reflective surface for propagating light within and along the axis of the tube;
a longitudinally extending diffusing medium arranged in said tube interior substantially diametrically opposite said light-transmissible wall portion to diffuse light striking said diffusing medium both directly and by reflection from said reflective wall surface,
whereby light supplied to said tube is propagated along said tube and light in said tube impinging on said diffusing medium causes light from the diffusing medium to pass outwardly through said light-transmissible portion.

12. An elongated lighting arrangement comprising:
an elongated tube having an interior and having the property of propagating light axially therewithin,
said tube having a light-transmissible wall portion extending along the length of the tube, said light-transmissible portion being formed as a longitudinal slit in said elongated tube;
a lens arrangement in said slit for distributing light over a predetermined region,
said tube also having an internally reflective surface for propagating light within and along the axis of the tube,
a longitudinally extending diffusing medium arranged in said tube interior substantially diametrically opposite said light-transmissible wall portion to diffuse light striking said diffusing medium both directly and by reflection from said reflective wall surface,
whereby light supplied to said tube is propagated along said tube and light in said tube impinging on said diffusing medium causes light from the diffusing medium to pass outwardly through said light-transmissible portion.

13. The arrangement as defined in claim 12, wherein said lens has a plurality sections of different thicknesses for selectively spreading light over different regions.

14. The arrangement as defined in claim 13, having two said sections, wherein said sections are arranged so that an imaginary plane separates said sections, each of said sections being formed with a surface sloping away from said imaginary plane at a respective angle.

15. The arrangement as defined in claim 12, wherein said lens is linear, prismatic, and clear.

16. An elongated lighting arrangement including
an elongated tube having an interior,
said tube having a light-transmissible wall portion extending along the length of said tube,
said tube also having an internally reflective surface for propagating light within and along the axis of the tube;
a longitudinally extending diffusing medium arranged in said tube interior substantially diametrically opposite said light-transmissible wall portion to diffuse light striking said diffusing medium both directly and by reflection from said reflective wall surface,
whereby light supplied to said tube is propagated along said tube and light in said tube impinging on said diffusing medium causes light from the diffusing medium to pass outwardly through said light-transmissible portion,
an outer tube having a plurality of light-transmissible colored portions of different colors, said outer tube concentrically surrounding said elongated tube; and
means for rotating one of said outer tube and said elongated tube relative to the other into a predetermined relative position so that only one of said colored portions is exposed to the light which is transmitted through said light-transmissible portion for effecting selective color illumination.

17. An elongated light display comprising a plurality of substantially linear segments arranged end to end, each of said segments comprising
an elongated tube having an interior,
a light source for emitting light into said tube at one end thereof,
said tube also having an internally reflective surface for propagating light within and along the axis of the tube;
a longitudinally extending diffusing medium arranged in said tube interior substantially diametrically opposite said light-transmissible wall portion to diffuse light striking said diffusing medium both directly and by reflection from said reflective wall surface,
whereby light supplied to said tube is propagated along said tube and light in said tube impinging on said diffusing medium causes light from the diffusing medium to pass outwardly through said light-transmissible portion.

18. An elongated lighting arrangement comprising:
an elongated tube having an interior and having the property of propagating light axially therewithin,
said tube having a light-transmissible wall portion extending along the length of the tube,
said tube also having an internally reflective surface for propagating light within and along the axis of the tube,
a longitudinally extending diffusing medium arranged in said tube interior substantially diametrically opposite said light-transmissible wall portion to diffuse light striking said diffusing medium both directly and by reflection from said reflective wall surface,
whereby light supplied to said tube is propagated along said tube and light in said tube impinging on said diffusing medium causes light from the diffusing medium to pass outwardly through said light-transmissible portion, a light source for emitting light into said tube at one end thereof, a second light source arranged to emit light into said elongated tube at the end thereof opposite said first light source, each of said light sources being pivotally mounted to permit rotation thereof substantially 90 degrees whereby said light sources may be readily replaced.

19. An elongated illuminating arrangement comprising an elongated tube having a hollow interior, said tube having a trans-reflective lining to projecting light within and substantially along the axis of the tube, a light reflecting and diffusing surface between said lining and the wall of said tube, a lamp socket at each end of said tube adapted to hold a light bulb substantially axially of said tube, and a light reflector surrounding each socket and adapted to reflect light along said tube, a portion of the wall of said tube being light-transmissible at a region spaced from said light reflecting and diffusing surface, said tube having a flat transparent wall portion, and said lining having a flat sheet portion juxtaposed to the inside of said transparent portion.

20. An arrangement as in claim 19 wherein said tube is transparent at a region adjacent to and angularly disposed with respect to said flat transparent wall portion.

21. An arrangement as in claim 19 wherein said lining has a curved portion conforming generally to the interior of said tube spaced from said flat portion.

22. An arrangement as in claim 21, said curved lining portion being shorter than said flat lining portion.

23. An arrangement as in claim 19 wherein said tube wall opposite said flat portion is of a light color to reflect and diffuse light impinging thereon.

24. An arrangement as in claim 23 wherein said tube is formed of clear transparent plastic, and said light color portion is formed by a white coating on the outside of said tube.

25. An arrangement as in claim 24 including a dark opaque coating on the outside of said light color coating.

26. An elongated illuminating arrangement comprising an elongated tube having a hollow interior, said tube having a trans-reflective lining for projecting light within and substantially along the axis of the tube, a light reflecting and diffusing surface between said lining and the wall of said tube, a lamp socket at each end of said tube adapted to hold a light bulb substantially axially of said tube, and a light reflector surrounding each socket and adapted to reflect light along said tube, each said socket being pivotally mounted within said tube and adapted to be pivoted to an angle to the axis of said tube for permitting ready withdrawal of said light bulb from said socket.

27. An illuminating arrangement comprising a generally cylindrical elongated housing having a substantially flat transparent face, a first trans-reflective sheet juxtaposed to the interior of said clear face along a pre-determined length of said housing, a curved second trans-reflective sheet lining the interior of said housing opposite said first sheet said curved sheet extending behind said first sheet for only part of the length thereof, the interior of said housing being of light color to reflect and diffuse light impinging thereon, a lamp socket at each end of said housing, and a reflector associated with each socket for reflecting light generally axially of said housing.

28. A arrangement as in claim 27 wherein said housing is transparent at regions corresponding to ends of said first sheet beyond the extent of said curved second sheet and on a face of said housing angularly disposed with respect to said clear face.

29. A method for illuminating a sign or the like, comprising the steps of:

exposing to light the interior of an elongated tube which has a reflective inner surface extending along said tube;

propagating the light within the interior of the tube by reflecting the light from said reflective surface of the tube;

providing a diffusing medium in a portion of the tube extending along the length of the tube to diffuse and scatter said reflected light impinging thereon;

directing the diffused and scattered light transversely outwardly of said tube through a light-transmissible section extending longitudinally of said tube, concentrically surrounding said first tube with an outer second tube having a plurality of light-transmissible portions of different colors; and selectively exposing only one of said light-transmissible color portions to the diffused light.

* * * * *